United States Patent
Chowdhury et al.

(10) Patent No.: US 8,615,150 B2
(45) Date of Patent: Dec. 24, 2013

(54) METHOD EMPLOYING MULTIFERROIC MATERIALS FOR TUNABLE PERMITTIVITY OR PERMEABILITY

(75) Inventors: Aref Chowdhury, Berkeley Heights, NJ (US); Arthur Penn Ramirez, Summit, NJ (US); Theo Max Siegrist, Livingston, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/590,834

(22) Filed: Aug. 21, 2012

(65) Prior Publication Data

US 2012/0314987 A1    Dec. 13, 2012

Related U.S. Application Data

(62) Division of application No. 12/498,505, filed on Jul. 7, 2009, now Pat. No. 8,280,210.

(51) Int. Cl.
*G02F 1/295* (2006.01)
*H01P 3/00* (2006.01)

(52) U.S. Cl.
USPC ............................................ 385/122; 333/239

(58) Field of Classification Search
USPC ................... 385/122, 123, 147; 333/239; 360/123.01, 135; 343/787, 911 R, 343/700 MS
See application file for complete search history.

(56) References Cited

U.S. PATENT DOCUMENTS

| 7,750,869 | B2 * | 7/2010 | Mosallaei ................. | 343/911 R |
| 2008/0145693 | A1 | 6/2008 | Zou et al. | |
| 2009/0059424 | A1 * | 3/2009 | Kim et al. ................ | 360/123.01 |
| 2009/0196818 | A1 | 8/2009 | Tokura et al. | |
| 2009/0246543 | A1 | 10/2009 | Noh et al. | |

FOREIGN PATENT DOCUMENTS

| KR | 1020090022188 A | 3/2009 |
| WO | 2007099277 A1 | 9/2007 |
| WO | 2007114561 A1 | 11/2007 |
| WO | 2007135817 A1 | 11/2007 |

OTHER PUBLICATIONS

Kimura, T., et al.; "Cupric Oxide as an Induced-Multiferroic with High-Tc"; Nature Materials/Advance-Online Publication/www.nature.com/naturematerials; 4 pages, ( year 2008).

Pimenov, A., et al.; "Negative Refraction Observed in a Metallic Ferromagnet in the Gigahertz Frequency Range"; 2007; The American Physical Society; PRL 98 197401 (2007); Physical Review Letters; 4 pages.

Nan, et al.; "Multiferroc Magnetoelectric Composites: Historical perspective, Status, and Future Directions"; Journal of Applied Physics 103, 031101 (2008); 35 pages.

Sharan, et al.; "Bismuth Manganite: A Multiferroic with a Large Nonliner Optical Response"; Physical Review B 69, 214109, 2004 The American Physical Society; pp. 214109-1-214109-7.

(Continued)

*Primary Examiner* — Akm Enayet Ullah
(74) *Attorney, Agent, or Firm* — Hitt Gaines, PC

(57) ABSTRACT

A method of processing an electromagnetic signal, comprising includes configuring a waveguide that includes a multiferroic medium to propagate the electromagnetic signal. A mechanical strain or a control electrical or magnetic field is applied to the waveguide such that the applying changes a permittivity or a permeability of the medium. The electromagnetic signal is propagated through said waveguide while performing the applying.

10 Claims, 10 Drawing Sheets

(56) References Cited

OTHER PUBLICATIONS

Altshuler, E., et al.; "A Review of an Electrically Small Antenna Immersed in a Dielectric"; 4 pages http://ursi-test.intec.ugent.be/files/URSIGA08/papers/BCDp6.pdf.

Srinivasan, Gopalan, et al.;Symposium: Engineered Multiferroics—Magnetoelectric Interactions, Sensors, and Devices; MRS Materials Research Society; 2009 Spring Meeting; 10 pages.

* cited by examiner

METHOD EMPLOYING MULTIFERROIC MATERIALS FOR TUNABLE PERMITTIVITY OR PERMEABILITY

TECHNICAL FIELD OF THE INVENTION

This Application is a Divisional of U.S. application Ser. No. 12/498,505 filed on Jul. 7, 2009, now U.S. Pat. No. 8,280,210 issued Oct. 2, 2012, to Aref Chowdhury, et al., entitled "Apparatus Employing Multiferroic Materials for Tunable Permittivity or Permeability", currently allowed, commonly assigned with the present invention and incorporated herein by reference.

TECHNICAL FIELD OF THE INVENTION

The present invention relates to the technical field of electronic materials and devices.

BACKGROUND

This section introduces aspects that may be helpful to facilitating a better understanding of the inventions. Accordingly, the statements of this section are to be read in this light and are not to be understood as admissions about what is prior art or what is not the prior art.

Multiferroic materials are the subject of intense research interest. Such materials may be characterized as having a coupled ferroic order parameters. Such coupling may be between, e.g., a ferromagnetic and ferroelectric response. Thus, an applied electric field may influence ferromagnetic polarization of the material, and an applied magnetic field may affect the dielectric polarization. In some cases, mechanical strain may also serve to induce an electrical or magnetic polarization.

SUMMARY

One embodiment is a method of processing an electromagnetic signal. The method includes configuring a waveguide that includes a multiferroic medium to propagate the electromagnetic signal. A mechanical strain or a control electrical or magnetic field is applied to the waveguide such that the applying changes a permittivity or a permeability of the medium. An electromagnetic signal is propagated through the waveguide while performing the applying.

Another embodiment is a method of processing an electromagnetic signal. A metamaterial that includes a multiferroic medium is located in a propagation path of the electromagnetic signal. An electric or magnetic field is applied to the metamaterial, thereby changing a permittivity or permeability of the medium. A propagation characteristic of the electromagnetic field is changed by the applying.

BRIEF DESCRIPTION OF THE DRAWINGS

Various embodiments are understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION OF ILLUSTRATIVE EMBODIMENTS

Embodiments described herein reflect the recognition that a multiferroic medium may be manipulated to provide tunable and efficient electronic devices such as, e.g., optical devices, antennae and filters. Such tuning may be effected, e.g., by modulating the dielectric permittivity, $\in$, and/or magnetic permeability, $\mu$, of the medium by way of an external stimulus such as, e.g., an electric or a magnetic field. In some embodiments, a mechanical stimulus such as an applied stress or an applied strain modulates $\in$ and/or $\mu$. (Hereinafter, for brevity, the dielectric permittivity is referred to as $\in$ or "permittivity" and the magnetic permeability is referred to as $\mu$ or "permeability" without loss of generality. Furthermore, while it is recognized that $\in$ and $\mu$ are in general complex quantities, both are used herein as substantially real quantities without notational elaboration.) In some embodiments, the index of refraction of the medium is varied by such modulation, while in other cases the impedance of a reactive network may be responsive to the stimulus. Such modulation of the dielectric and ferromagnetic properties of the medium provides a means to dynamically adjust optical or impedance characteristics of a device employing the multiferroic.

As used herein a multiferroic medium is a homogeneous or heterogeneous material exhibiting coupled ferroic properties. Coupled ferroic properties that are characteristic of a multiferroic material are, e.g., coupled ferroelectric and ferromagnetic properties. Thus, an applied magnetic field may alter the dielectric polarization of the medium, and an applied electric field may alter the magnetic polarization of the medium.

Permittivity is related to the dielectric polarization, and permeability is related to the magnetic polarization. Thus, a magnetic field may be used to change the dielectric permittivity of the medium, and an electric field may be used to change the magnetic permeability of the medium. In some cases, mechanical stress and/or strain may change the permittivity or the permeability. Restated in more general terms, an external stimulus may change the permittivity or the permeability of the multiferroic medium. The stimulus may also change the refractive index (RI), taken as $(\in\mu)^{1/2}$.

Figure 1A:
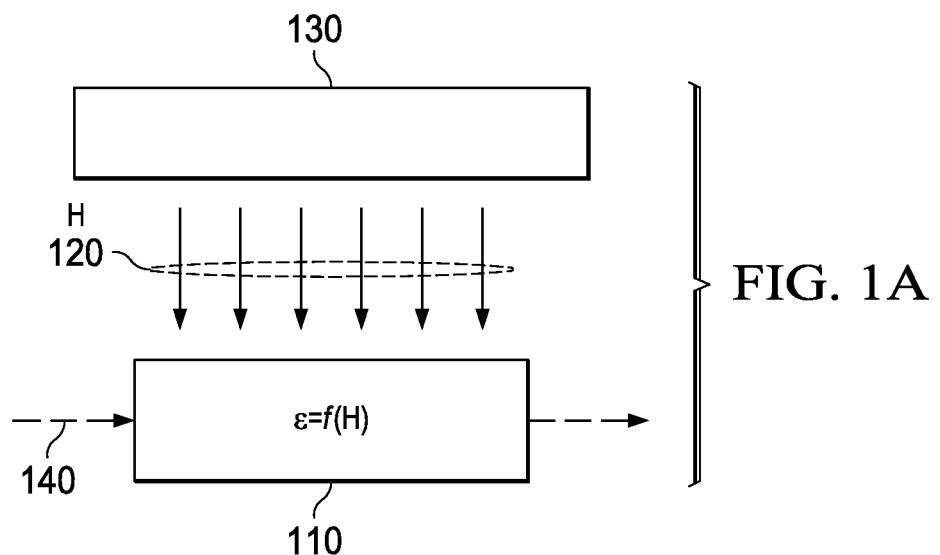
FIGS. 1A and 1B illustrate general embodiments of modulation of an input signal by a multiferroic medium.

FIG. 1A schematically illustrates a general embodiment of modulating a signal using a multiferroic medium 110. A controller subjects the multiferroic medium 110 to an external stimulus 120. In this embodiment, the external stimulus 120 is a magnetic field H. Due to the multiferroic nature of the multiferroic medium 110, the dielectric permittivity $\in$ of the medium multiferroic 110 changes in response to a change in the magnetic field H. This dependence is signified by the notation $\in$=f(H). An electromagnetic (EM) input signal 140 is coupled to the multiferroic medium 110. The EM signal may be modulated by the change of $\in$ caused by the stimulus 120. The EM signal may have a frequency, e.g., in a range from near-DC (Hz) to UV (PHz).

Figure 1B:
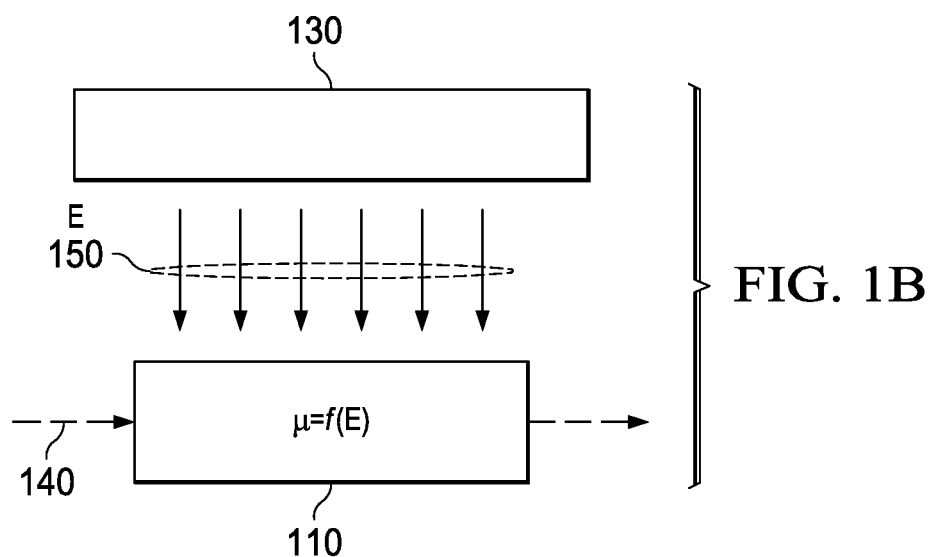

FIG. 1B illustrates an embodiment in which the external stimulus 150 is an electric field E. Due to the multiferroic nature of the multiferroic medium 110, a magnetic permeability μ of the changes in response to a change in the electric field E. This dependence is signified by the notation μ=f(E). The EM signal may be modulated by the change of μ caused by the stimulus 120.

In various embodiments, E and H are simultaneously applied to the multiferroic medium 110 to produce a desired effect on the input signal 140. In some embodiments, the controller 130 is a source of mechanical stress and/or strain. For example, a flexible substrate upon which the multiferroic medium 110 is located may be deformed by the controller 130.

An electric field stimulus may be applied to a structure including a multiferroic medium by a conventional method, e.g., via conductive electrodes or plates. Such electrodes or plates may be configured to provide an electric field locally to a small portion of a larger device, or may be configured to provide an electric field to multiple devices or multiple multiferroic regions. A magnetic field stimulus also may be applied to all or a portion of the multiferroic medium 110 by any conventional method. Examples include an electromagnet and a permanent-pole magnet.

In some embodiments, a stimulus including an electric and/or magnetic field may be static. Herein, a static stimulus refers to a stimulus, such as a stimulus provided by the controller 130, having a magnitude that does not vary substantially over a temporal period of a signal being modulated thereby, e.g. the input signal 140. In other embodiments, the stimulus is nonstatic, meaning the stimulus may change on a time scale similar to or shorter than a period of the signal being modulated thereby.

In some cases, the response of the permittivity or the permeability of the multiferroic medium 110 to an external stimulus may be isotropic, e.g., having a negligible dependence on orientation of the medium relative to the stimulus. In other cases, the response may be anisotropic, e.g., the orientation of the medium in relation to the stimulus has a non-negligible effect on $\in$ or μ. Additional anisotropy may also be induced by the shape of the material sample in some cases. Such shape anisotropy is typically most pronounced for soft magnetic materials.

Figure 2A:
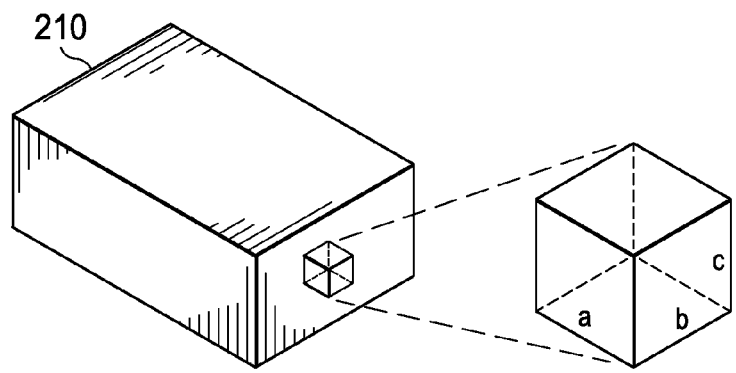
FIGS. 2A-2C illustrate homogeneous and heterogeneous multiferroic media.

A multiferroic medium may be a homogeneous or a heterogeneous crystalline material. A homogeneous material may be, e.g., a crystalline material with long-range periodicity of a primitive cell in which atoms are arranged in a manner that confers coupled ferroic properties. Such a medium is illustrated in FIG. 2A, where a multiferroic material 210 has general lattice parameters a, b, and c. As a nonlimiting example, homogeneous multiferroic materials are expected to include some compounds with a perovskite structure.

In some cases, a homogenous multiferroic medium may include some cations selected to confer ferroelectric characteristics to the material, and others that confer ferromagnetic characteristics. For example, cations associated with ferroelectric characteristics include some group 3, 4 and 5 transition metals, e.g., Cr. Cations associated with ferromagnetic characteristics include those of some elements with partially occupied d- and f-shells, e.g., Fe, Ni, Co, Gd and Dy. Cations of the material may be balanced by anions such as, e.g., $O^{2-}$, $S^{2-}$, and $(SO_4)^{2-}$. Thus, for example, it is expected that $CoFe_2O_4$ and chromium oxide may function as multiferroic materials over some temperature ranges.

In some cases, elements outside the group 3, 4 and 5 transition metals, such as Bi, e.g., may contribute ferroelectric properties. Nonlimiting examples of such materials include $BiFeO_3$ and $HoMnO_3$. A ferromagnetic or antiferromagnetic ordering temperature of such a composition may be below room temperature.

In some cases, the multiferroic material may be chemically relatively simple. Copper and Mn are two of a small number of elements, some cations of which may break inversion symmetry in a primitive cell of the lattice of the compound formed with a counterbalancing anion. One example is CuO, which typically requires cooling below 0° C. to allow the unit cells of the crystal lattice to assume a configuration that results in multiferroic properties.

Figure 2B:
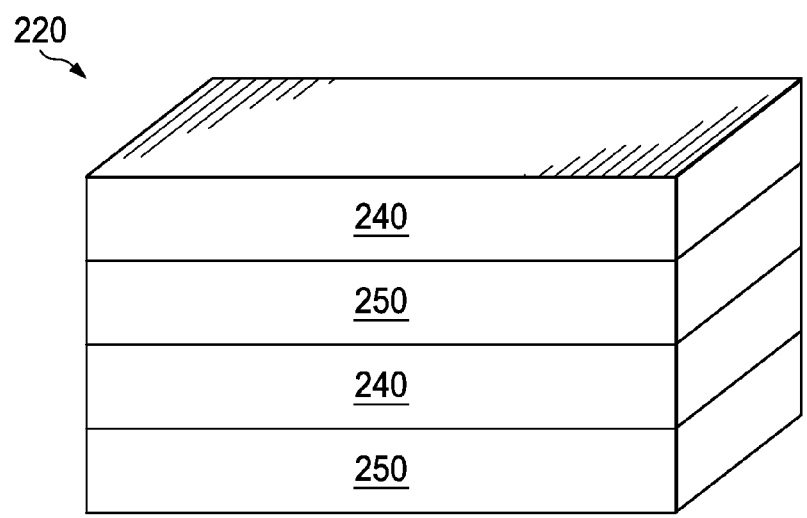
Figure 2C:
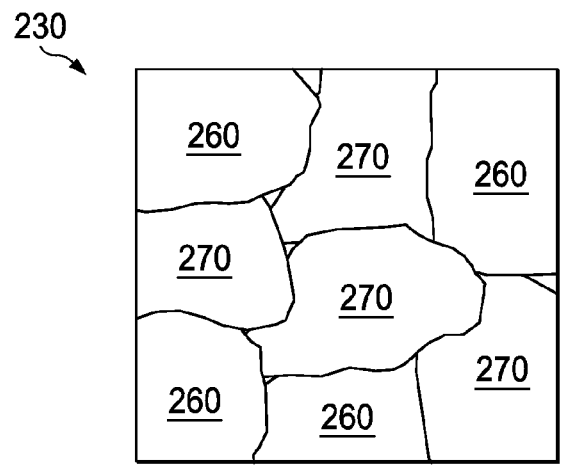

FIGS. 2B and 2C illustrate examples of heterogeneous multiferroic media 220 and 230, respectively. A heterogeneous multiferroic medium may provide a degree of freedom not provided by a homogeneous multiferroic material for producing the desired coupling between ferroelectric and ferromagnetic domains. Separate domains of, e.g., ferromagnetic and ferroelectric materials may be formed, with neighboring domains sharing an interface. The ferromagnetic and ferroelectric domains may comprise materials that do not easily form homogeneous compounds. When the domains share an interface the ferroelectric ordering of a ferroelectric domain may couple to the ferromagnetic ordering of a neighboring ferromagnetic domain, leading to multiferroic behavior.

FIG. 2B illustrates an embodiment in which the multiferroic medium 220 includes alternating layers 240, 250. The layers 240, 250 may respectively be, e.g., a ferroelectric material and a ferromagnetic material. In this case, coupling is generally over a two-dimensional interface. Generally, the response of the medium 220 to an external stimulus is expected to be anisotropic because of the planar nature of the medium 220. While such anisotropy may limit the applications of the medium 220, the layered structure may be formed in a manner that results in well-controlled material properties.

In some cases, the medium 220 may be used as a waveguide. Light may be configured to travel in the medium 220 with a propagation direction, e.g., Poynting vector, about parallel to the interface between the layers 240, 250 to substantially maximize the interaction of the light with the interfaces. Such an orientation is expected to maximize the effect of modulating the permittivity and/or permeability of the medium 220.

In some embodiments, the thickness of the layers 240, 250 is no greater than about twice a depth over which the ferroelectric and ferromagnetic responses couple. This thickness may be, e.g., on the order of about 100 nm. In a nonlimiting example, 50 nm layers of $BaTiO_3$ (e.g., ferroelectric) alternating with 150 nm layers of $CoFe_2O_4$ or $BaFe_{12}O_{19}$ (e.g., ferromagnetic) is expected to exhibit multiferroic properties. Such a layered medium may be formed by various conventional material growth techniques, including, e.g., chemical vapor deposition (CVD), physical vapor deposition (PVD) and molecular beam epitaxy (MBE).

FIG. 2C illustrates an embodiment in which the multiferroic medium 230 includes ferroelectric domains 260 and ferromagnetic domains 270. The domains 260, 270 are large enough to exhibit crystalline properties, e.g., having a mean diameter greater than about 50 nm. The lattice orientations of the domains 260, 270 have a pseudo-random distribution. Each domain 260, 270 shares an interface with a neighboring domain 260, 270. When the neighboring domains are dissimilar materials, e.g., ferroelectric and ferromagnetic, the ferroelectric and ferromagnetic properties are expected to couple, leading to multiferroic behavior. Because the domains 260, 270 are arranged pseudo-randomly, the multiferroic properties of the medium are expected to be substantially isotropic. The medium 230 may be advantageous in applications in which isotropic properties are desired, such as, e.g., capacitive or inductive elements or circuit substrates.

The medium 230 may be formed, e.g., by sintering intermixed particles of a ferroelectric material and a ferromagnetic material. Such a process will in general depend on the properties of the materials being sintered. As an illustrative example, a powdered quantity of $BaTiO_3$ may be uniformly dispersed with a powdered quantity of $CoFe_2O_4$ and/or $BaFe_{12}O_{19}$ with a ratio that results in approximately equal atomic percentages of Ti and Fe. The mean particle size in each sample may be about 100 nm or less. The mixed sample may be sintered at a temperature of 1200 C for air for several days. Those skilled in the ceramic arts, e.g., are capable of determining appropriate processing conditions for other sintered hetero-multiferroic media.

Figure 3A:
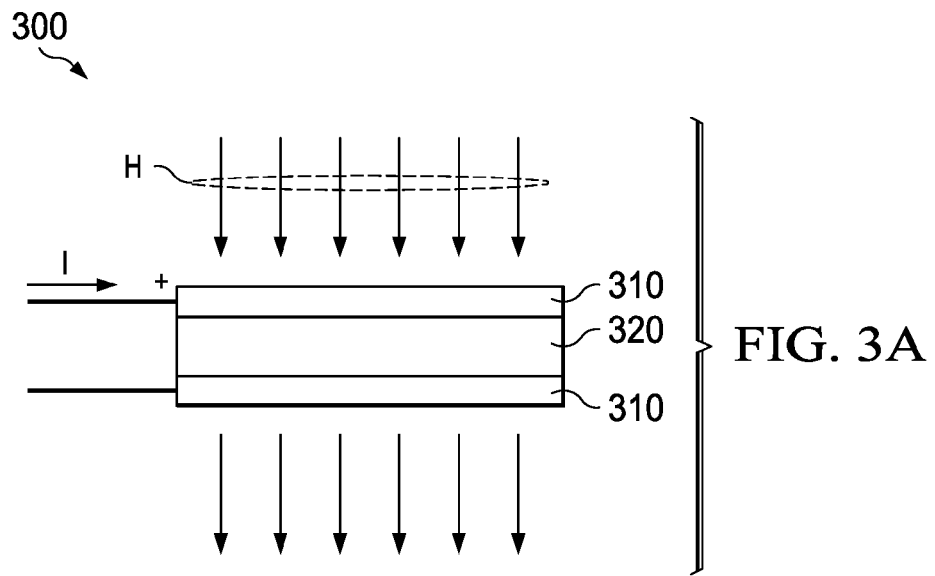
FIGS. 3A and 3B respectively illustrate a capacitive element and an inductive element of the disclosure.

Embodiments include a multiferroic material used as a dielectric or magnetically permeable medium in a passive component of an electrical circuit. The component may be configured to change a reactance in response to an external stimulus. For instance, FIG. 3A illustrates an example embodiment of a capacitive element 300. The capacitive element 300 is shown, e.g., as a parallel plate capacitor with plates 310 and a dielectric 320 therebetween. The configuration of the capacitive element 300 is illustrative of various configurations, including, e.g., comb and plate capacitors. In the capacitive element 300, the dielectric 320 is a multiferroic medium. The capacitive element 300 is illustrated in a magnetic field H. Because the permittivity of the dielectric 320 is a function of H, varying the magnitude of H applied to the capacitive element 300 may modulate the capacitance thereof. Varying H will also generally modulate the RI.

In another embodiment, a multiferroic medium such as the dielectric 320 may be a gate dielectric of a FET or a MOSFET. Such a FET or MOSFET may be used, e.g., as a magnetic field sensor, because the gate dielectric has a dielectric permittivity that is responsive to changes in an external magnetic field.

Figure 3B:
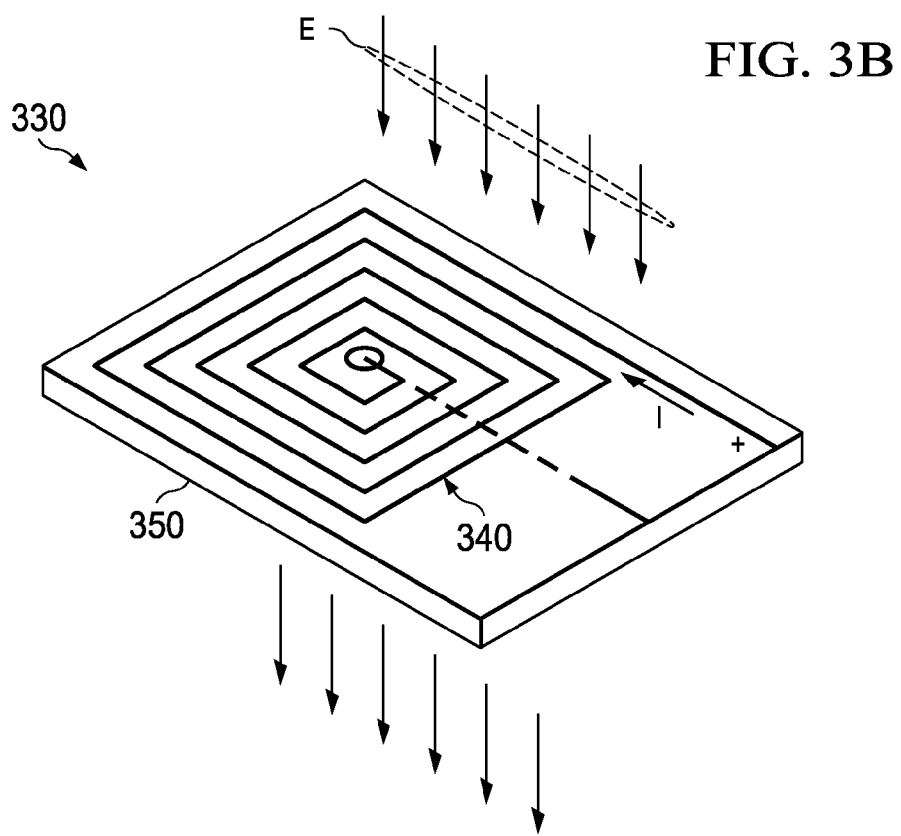

FIG. 3B illustrates an embodiment of an inductive element 330, illustrated as a planar coil 340, e.g. The planar coil 340 is formed on a substrate 350 that includes a multiferroic material. The inductive element 330 is shown with an applied electric field E. Because the permeability of the substrate 350 is a function of E, the inductance of the coil 340 may be altered by changing the magnitude of E applied to the substrate 350 under the coil 340.

Embodiments include passive/reactive electrical circuits with components that include multiferroic dielectrics and magnetically permeable media. The response of the multiferroic medium to an external stimulus provides a means to tune an operating characteristic of an electronic device whose operation is affected by the permittivity or permeability of the multiferroic medium. Further embodiments include active components in combination with passive components.

Figure 4:
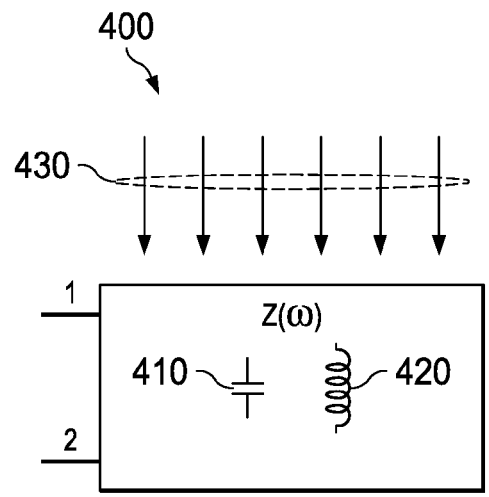
FIG. 4 illustrates a reactive network of the disclosure.

In an embodiment illustrated in FIG. 4, a reactive network 400, e.g., an L-C (inductive-capacitive) network, may have an impedance $Z(\omega)$ that depends on the impedance of one or more capacitors 410 or inductors 420 in the network. The reactive network 400 is shown without limitation as, e.g., a two-port network. The impedance may be, e.g., an input impedance at ports 1 and 2. In the reactive network 400, one or more of the capacitors 410 and/or inductors 420 include a multiferroic medium. Thus, the capacitance and/or inductance of one or more these elements of the reactive network 400 may be changed by applying an external stimulus, e.g., an external electric or a magnetic field, or a mechanical stress or strain, to the one or more elements. Such stimuli can thereby change the impedance of a portion of the reactive network 400 and/or electrical resonance characteristics of the portion of the reactive network 400.

In some embodiments, the reactive network 400 may include an antenna that has an impedance that depends on a dielectric permittivity or magnetic permeability of a multiferroic material. For example, the antenna may have a radiating element that has a distributed capacitance or inductance that is determined in part by a multiferroic medium electromagnetically coupled to the radiating element. For example, the multiferroic medium may be used as a substrate upon which radiating elements may be formed. An externally applied stimulus, e.g., electric or magnetic field or mechanical stress, may be applied to change the distributed capacitance or inductance, and thereby the impedance of the antenna. Thus, the radiative properties and/or gain of the antenna may be modulated by the external stimulus.

In another embodiment the reactive network 400 may terminate a signal path, such as a waveguide or high speed signal path, that has a characteristic impedance that varies with time. The input impedance of the network may be controlled by, e.g., an external controller that changes the dielectric permittivity or magnetic permeability of one or more components of the network to maintain an impedance match between the signal path and the reactive network 400.

Various embodiments of electronic circuits include capacitive and/or inductive elements having multiferroic materials therein. For example, a radio-frequency transmitter or receiver may include an electrical filter with passband characteristics determined in part by the capacitance or inductance, respectively, of a capacitor or inductor having a multiferroic material therein. In such embodiments, the capacitive element 300 and the inductive element 330 may enable the tuning of a frequency of operation of the transmitter or receiver by the application of an electric or magnetic field to the circuit element(s) that includes a multiferroic material.

Figure 6A:
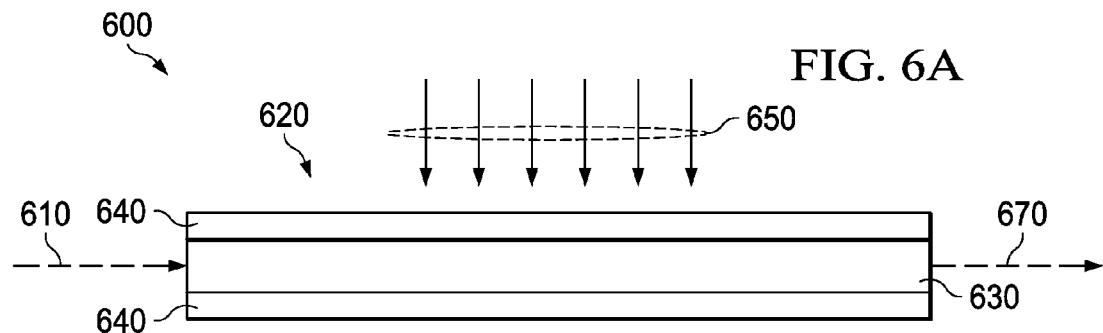
FIGS. 6A and 6B illustrate a plan and sectional view, respectively, of an optical waveguide with a multiferroic medium.
Figure 6B:
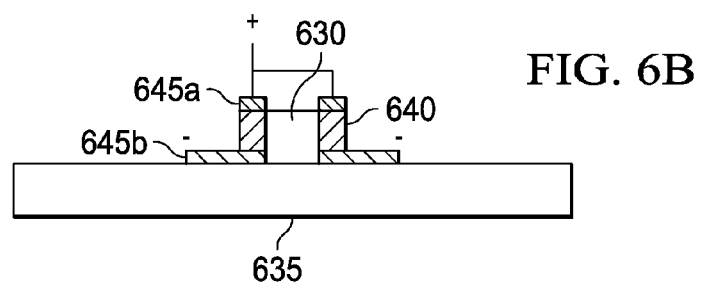

FIGS. 6A and 6B illustrate a plan and sectional view, respectively, of an embodiment of a device 600 in which an electromagnetic signal 610 propagates via a waveguide 620. The waveguide 620 includes a core 630 and a cladding 640.

In a first embodiment, the core 630 is a conventional optical medium that is transparent to an optical signal wavelength of interest, such as silicon or $SiO_2$. Herein and in the claims, an optical signal has a frequency in the IR, visible or UV range, generally taken to be in a range of about 30 THz to about 1 PHz. The cladding 640 is a multiferroic material that has an index of refraction that can be changed by the application of a magnetic or electric field, or by a mechanical stress. The field may be applied, e.g., by electrodes 645a, 645b formed on upper and lower surfaces of the cladding 640. Upper electrode 645a and lower electrode 645b may be oppositely charged to modulate the RI of the cladding.

In an example, the core 630 may be a planar optical waveguide formed over a substrate 635. The core may have a width of about 0.75 µm and a thickness of about 5 µm. These dimensions are suitable to transmit an optical electromagnetic signal 610 having a wavelength of about 1.3 µm, e.g.

The cladding 640 may be formed, adjacent the core 630, e.g., by conventional methods, and may optionally also cover the core 630.

The optical signal 610 is substantially confined to propagate in the waveguide 620 when the RI of the optical cladding 640 is less than that of the core 630. An external stimulus, e.g., the potential applied across the electrode 645a, 645b, may be used to modulate the permeability of the cladding 640, thus changing the index of refraction of the cladding 640 and thereby changing a transmission characteristic of the waveguide 620. For example, the RI of the cladding 640 may initially be less than that of the core 630, resulting in total internal reflection of a propagating light signal in the core 630. Application of the external stimulus 650 may cause the RI of the cladding 640 to become greater than that of the core 630, resulting in leakage of light from the core 630. Thus, an output signal 670 may be controllably attenuated relative to the input optical signal 610. In some embodiments, the RI is changed by the application of a magnetic field, or by stress or strain on the cladding 640.

In a second embodiment of the device 600, the core 630 is formed from a multiferroic material, and the cladding 640 is formed from a conventional cladding material. The RI of the core 630 varies in response to the stimulus 650 from a value less than the RI of the cladding 640 to a value greater than the cladding 640. Thus, in a manner analogous to the illustrated embodiment of the waveguide 620, the output signal 670 may be controllably attenuated.

In other embodiments, a waveguide may be configured to propagate microwave or terahertz frequencies. A microwave band may include frequencies in a range of about 300 MHz to about 3 GHz. A terahertz band may include frequencies in a range of about 30 THz to about 400 THz. In such cases, the cladding 640 may be metallic, and the core 630 may include a multiferroic medium. In such cases, the stimulus 650 may be limited to a magnetic field or a stress/strain. The stimulus 650 may change the $\in$ and/or $\mu$ of the core 630, altering the propagation characteristics of the microwave or terahertz signal therein. For example, the change $\in$ and/or $\mu$ may change the impedance of the waveguide 620.

In some embodiments, the multiferroic material is configured to tune a frequency range over which a medium acts as a metamaterial. A metamaterial is a medium having a negative RI, or that exhibits negative refraction. The RI has a negative sign when both the dielectric constant and magnetic permeability have negative real parts at a particular frequency. The negative RI causes electromagnetic radiation of the particular frequency to refract abnormally at interfaces between the metamaterial and media with positive refractive indexes. In abnormal refraction, incident and refracted light rays lie on the same side of the normal to the interface in the incidence plane.

Figure 7:
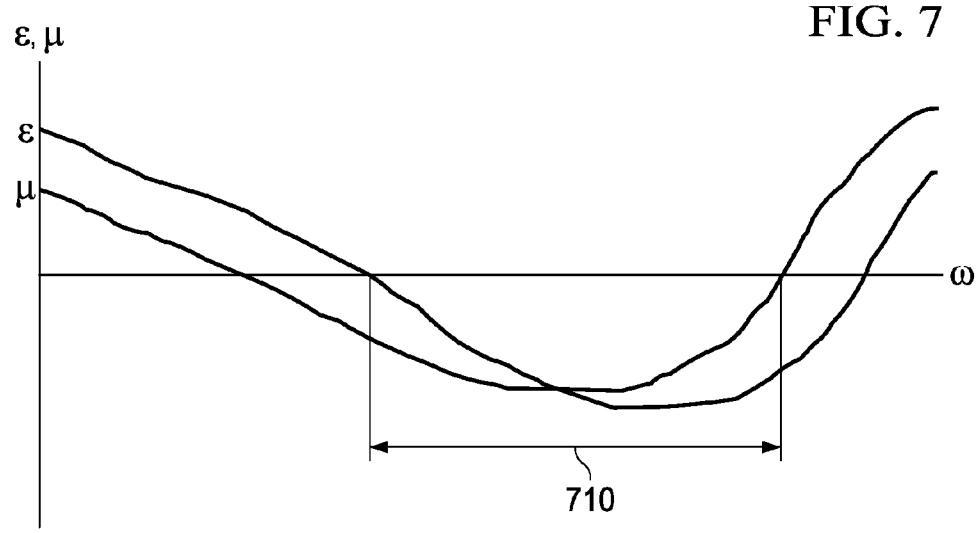
FIG. 7 illustrates a frequency-dependent $\in$ and $\mu$.

To illustrate, FIG. 7 illustrates an example of a permittivity characteristic and a permeability characteristic of an example metamaterial as a function of frequency. Both $\in$ and $\mu$ are negative in a frequency range 710. Because both $\in$ and $\mu$ are negative, the RI of the example medium is negative, and the medium is a metamaterial in this frequency range.

In some cases, a multiferroic medium is a material that may exhibit metamaterial behavior over a frequency range. See, e.g., A. Pimenov, et al., Negative Refractive Observed in a Metallic Ferromagnet in the Gigahertz Frequency Range, PRL 98, 197401 (1997). The frequency range may be changed by altering the frequency at which $\in$ and/or $\mu$ become negative. In other cases, a metamaterial is a composite periodic structure that includes a multiferroic material. A multiferroic material may be used to tune the frequency range 710 over which $\in$ and $\mu$ of the metamaterial are negative. This tuning may be done by changing the permittivity and/or permeability of portions of the multiferroic material placed at suitable locations in the metamaterial.

Figure 8A:
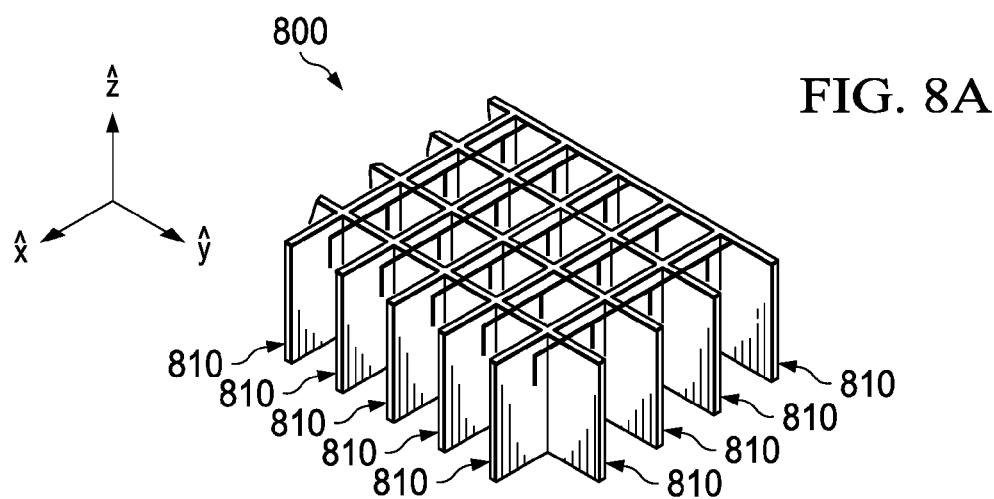
FIGS. 8A-8C illustrate a metamaterial formed using a multiferroic material.
Figure 8B:
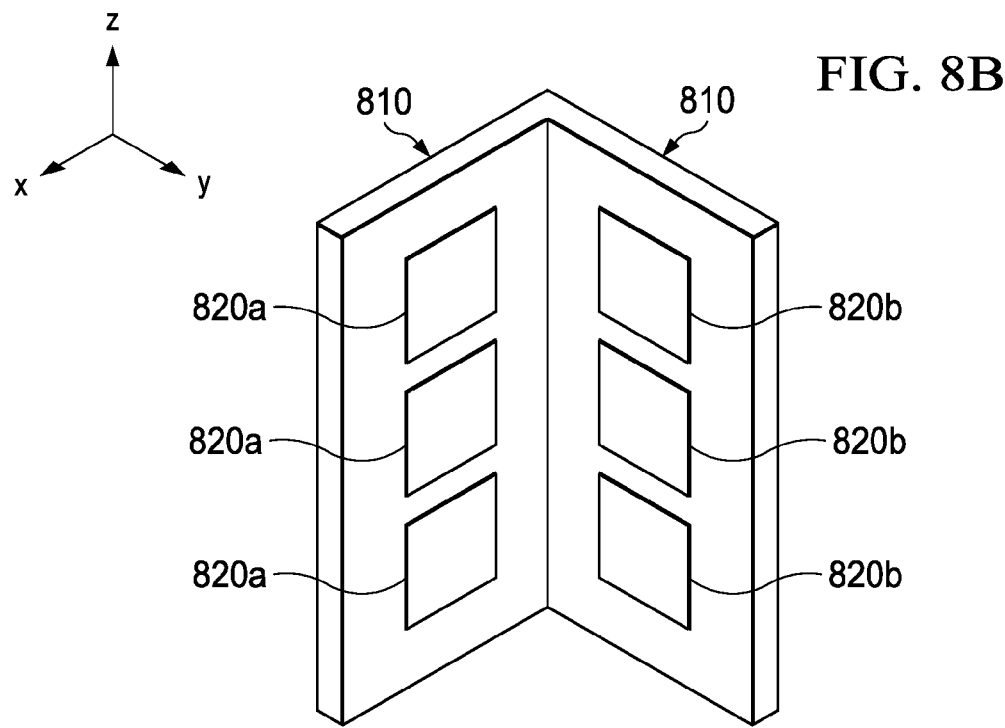

FIG. 8A illustrates an example metamaterial 800. A similar metamaterial is described in U.S. Pat. No. 7,015,865 to Isaacs, et al., incorporated herein by reference in its entirety. The metamaterial 800 is formed of a number of unit cells. A unit cell is shown in FIG. 8B, and includes two dielectric substrates 810, and a number of split ring resonators (SRRs) 820, three each of SRRs 820a and 820b.

Figure 8C:
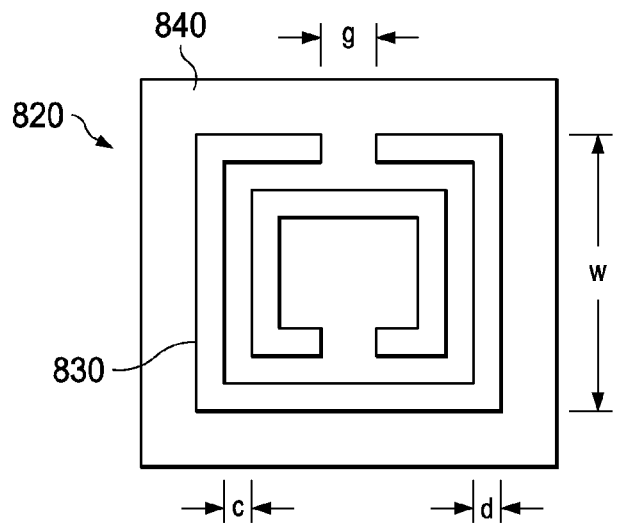

FIG. 8C illustrates a single SRR 820. The SRR 820 includes a reactive component comprising two split rings 830 on a multiferroic slab 840. The example split rings 830 are fabricated of a 0.03 mm thick copper layer and may have various ring-like shapes. The example SRR 820 has feature dimensions that satisfy: c=0.25 mm, d=0.30 mm, g=0.46 mm, and w=2.62 mm. The concentric metallic split rings 830 form a circuit element whose capacitance depends on the dielectric permittivity of the underlying multiferroic slab 840.

In an embodiment, the multiferroic slab 840 is formed of a multiferroic medium whose permittivity is a function of an applied external electric field normal to the surface of the slab. When the electric field is applied, the capacitance of the split rings 830 also changes. Referring to FIG. 8B, when an electric field is applied along the x axis, the capacitance of the SRRs 820b changes. When an electric field is applied along the y axis, the capacitance of the SRRs 820a changes. When either or both sets of SRRs 820a, 820b are caused to change capacitance due to the applied field(s), the frequency over which the metamaterial 800 has $\in$ and $\mu$ simultaneously negative changes. The frequency over which the metamaterial 800 has a negative RI thereby also changes. Thus, the external stimulus, e.g., the applied electric field, may change an operational characteristic of a device utilizing the multiferroic metamaterial 800.

The metamaterial 800 may be located in a propagation path of an electromagnetic signal. In some cases, the signal may propagate without spatial confinement (free-space propagation). In other cases, the signal me be confined by, e.g., a waveguide.

Figure 9:
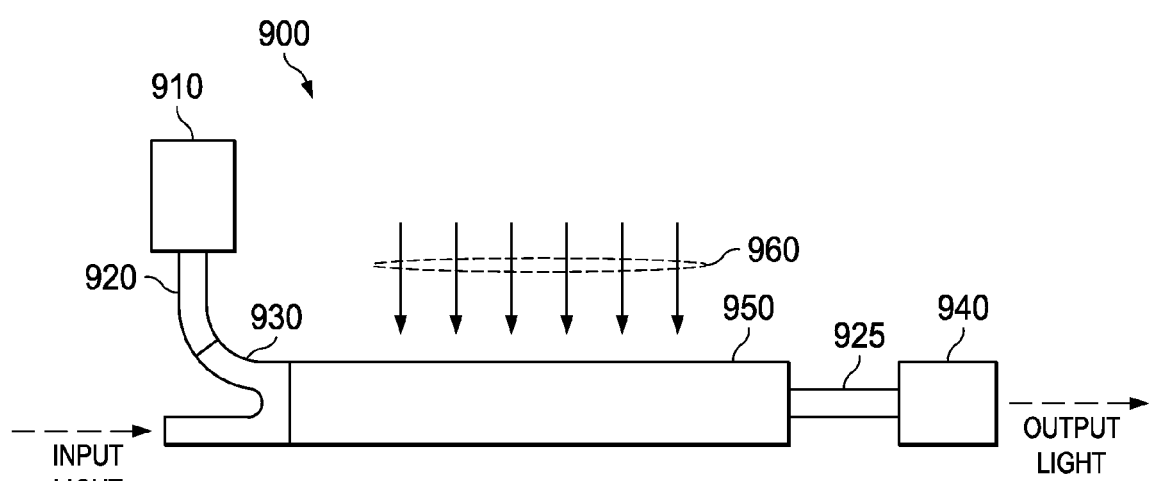
FIG. 9 illustrates an optical wavelength converter of the disclosure.

FIGS. 9-13 illustrate various embodiments of apparatus that may use a multiferroic medium that in some embodiments is also a metamaterial at some frequencies. Turning first to FIG. 9, illustrated is an example embodiment of an optical wavelength converter 900. A similar device is described in U.S. patent application Ser. No. 11/432,803, "Nonlinear Optical Devices Based on Metamaterials" by Chowdhury, et al., incorporated herein by reference in its entirety. Briefly described, the wavelength converter 900 includes a pump source 910, optical waveguides 920, 925, an optical connector 930, and a filter 940, all of which may be fabricated using methods well known to those of skill in the art. In an embodiment, dimensions of the various components of the wavelength converter 900 are selected such that the wavelength converter 900 is operable to convert a wavelength of about 1550 nm to about 775 nm. An optical conversion medium 950 is a metamaterial for light at a frequency of one or more of input light to be wavelength-converted, the pump light, and the wavelength-converted light. At least a portion of the optical conversion medium 950 is a multiferroic medium that is at least partially transparent to the frequency of light passing through the medium 950.

The wavelength of operation of the wavelength converter 900 depends in part on the frequency range over which the optical conversion medium 950 behaves as a metamaterial, e.g., has a negative RI. An external stimulus 960, e.g., an electric and/or magnetic field, or a mechanical stress and/or strain, is applied to the optical conversion medium 950. In one embodiment, the external stimulus 960 may be varied to alter the frequency range over which the optical conversion medium 950 behaves as a metamaterial. In another embodiment, the magnitude of the RI at a particular frequency may be changed by varying the external stimulus 960. Thus, the external stimulus 960 may used, e.g., to make fine adjustments to the RI of the optical conversion medium 950 to alter an operational characteristic of the wavelength converter 900. An operational characteristic may be, e.g., wavelength conversion via a negative RI medium as opposed to wavelength conversion with a positive RI medium.

In some embodiments, the optical conversion medium 950 is a multiferroic with a nonlinear optical response. Such a material may have, e.g., a Perovskite structure. In a nonlimiting example, bismuth manganite (BiMnO$_3$) is used as the medium 950. A 5 μm BiMnO$_3$ layer may be formed, e.g., as an epitaxial layer on a suitable substrate such as, e.g., SrTiO$_3$. The BiMnO$_3$ may be patterned and etched using conventional methods such as, e.g., a nonselective sputter etch to form an optical path. The width of the path may be, e.g., about 2 μm. The optical waveguides 920, 925 and the optical connector 930 may be formed from, e.g., a PMMA layer lithographically patterned by conventional methods. The PMMA layer may be cast in place after forming the medium 950 to provide a low insertion-loss interface between the optical connector 930 and the optical waveguide 925.

Figure 10:
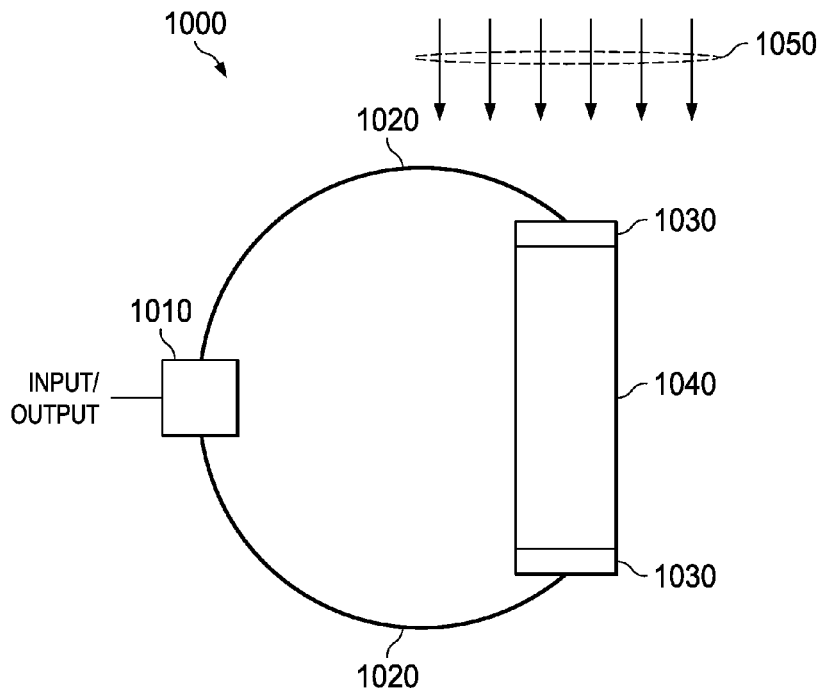
FIG. 10 illustrates a polarization diverse apparatus of the disclosure.

FIG. 10 illustrates an embodiment of a polarization diverse (PD) apparatus 1000 in which an optical path may include a metamaterial. The general operation of a similar PD apparatus is described in U.S. patent application Ser. No. 11/586,290, "Polarization-Diverse Negative-Refractive-Index Apparatus and Methods" by Chowdhury, incorporated herein by reference in its entirety. Briefly described, the PD apparatus 1000 includes a splitter 1010, optical path 1020, polarization rotators 1030 and a polarization sensitive negative RI (PS NRI) medium 1040. The medium 1040 may be, e.g., BiMnO$_3$ processed as previously described. The relevant dimensions of the structural elements of the apparatus 1000 may be determined by one skilled in the optical arts in light of specific application requirements.

The NRI medium 1040 produces an optical effect on an optical signal passing therethrough, meaning the NRI medium 1040 may alter, modulate or otherwise change one or more parameters, e.g., amplitude or phase, of the EM signal.

Because the (negative) RI of the medium 1040 is a function of the permittivity and the permeability thereof, the effect produced by the medium 1040 may be modulated by subjecting the medium 1040 to an external stimulus 1050 (electric or magnetic field, or stress/strain). The stimulus 1050 may be applied, e.g., by electrodes or an external coil. Thus, the apparatus 1000 may be tuned, e.g., by the external stimulus to precisely control the effect produced on the EM signal.

Figure 11:
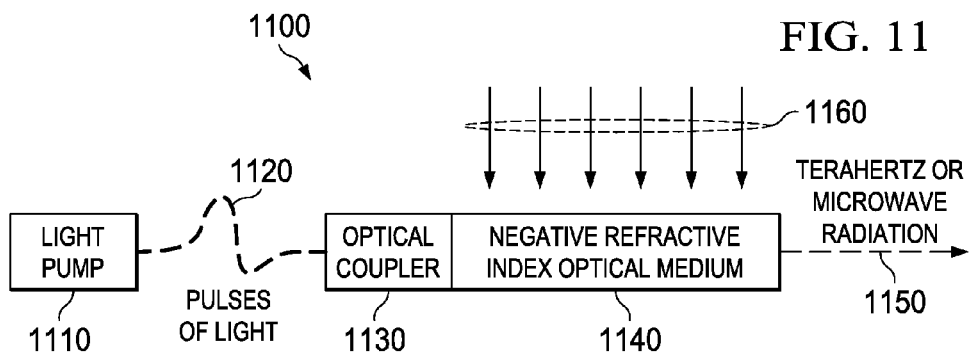
FIG. 11 illustrates an negative-refractive-index device of the disclosure.

FIG. 11 illustrates an embodiment of an NRI device 1100 for generating terahertz or microwave radiation. The operation of a similar device is generally described in U.S. patent application Ser. No. 11/942,776, "Negative Refractive Index Device for Generating Terahertz or Microwave Radiation and Method of Operation Thereof" by Chowdhury, et al. (the '776 application), incorporated herein by reference in its entirety. The NRI device 1100 includes a pump source 1110, an optical path 1120, an optical coupler 1130, and an NRI medium 1140, and produces EM radiation 1150. The NRI medium 1140 behaves as a metamaterial at a center frequency of light pulses produced by the pump source 1110. The medium 1140 also exhibits a second-order nonlinearity proximate the center frequency of the pulse and the output radiation of interest. The frequency of the EM radiation 1150 output by the NRI device 1100 is dependent in part on the center frequency. The medium 1140 may comprise, e.g., BiMnO$_3$.

As described in the '776 application, the light pulses enter and propagate through the NRI medium 1140. The pulses have an associated group velocity (dω/dk) that depends upon the RI. A resonance occurs in the medium 1140 producing light with a phase velocity ω/k that may be a function of the group velocity.

The NRI medium 1140 is a multiferroic material and a metamaterial. Thus, an external stimulus 1160, e.g., an electric and/or magnetic field as described with respect to, e.g., the apparatus 1000, may change the ∈ and/or the μ of the medium 1140. The change of ∈ and/or the μ may thereby change the group velocity of the light pulses and/or the resonant frequency of the medium 1140. For example, the RI may change from one negative value to another negative value. The change of resonant frequency changes the dispersion characteristics of the medium 1140. The medium 1140 may be used in combination with a tunable pump source 1110. For example, the center frequency of the light pulses output by the pump source 1110 can be tuned to match the change of the dispersion characteristic of the medium 1140, thereby changing the frequency of the radiation output by the NRI device 1100.

Figure 12:
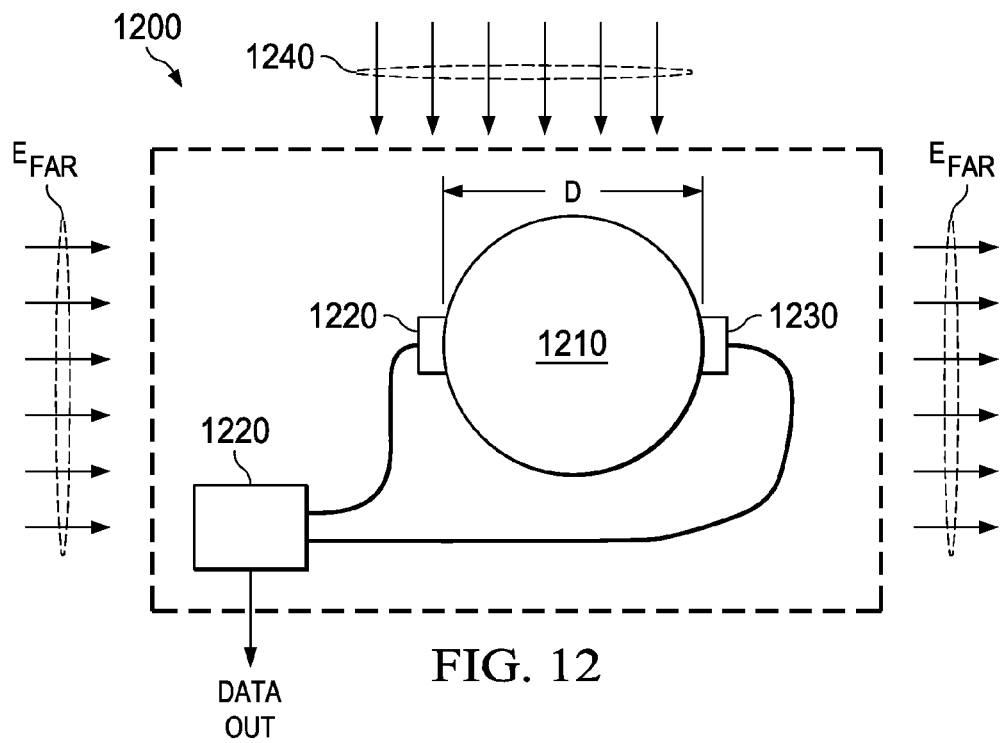
FIG. 12 illustrates an electromagnetic resonator of the disclosure.

FIG. 12 illustrates an embodiment of a device 1100 configured to respond resonantly to an applied electric field. The general operation of a similar device is described in U.S. Pat. No. 6,661,392 to Isaacs, et al., incorporated herein by reference in its entirety. A dielectric or magnetically permeable object 1210 includes a multiferroic medium for which at least ∈ or μ is negative at a frequency of a signal propagating as E$_{far}$. At a resonant frequency determined in part by the geometry of the object 1210, an electrical signal may be is produced at terminals 1220, 1230. The response of the device 1200 is resonant over a selected wavelength range so that the device 1200 may be an antenna for a radio frequency signal even though the signal has a wavelength that is much larger than a dimension D of the object 1210.

In some embodiments, the frequency at which the object 1210 is resonant is determined in part by the value of ∈. The value of ∈ may be tuned by application of an external stimulus 1240, e.g., a magnetic field. Thus, by changing the magnetic field, the resonant frequency of the object 1210 may be controllably changed, thereby tuning the frequency to which the device 1200 is sensitive.

Figure 13:
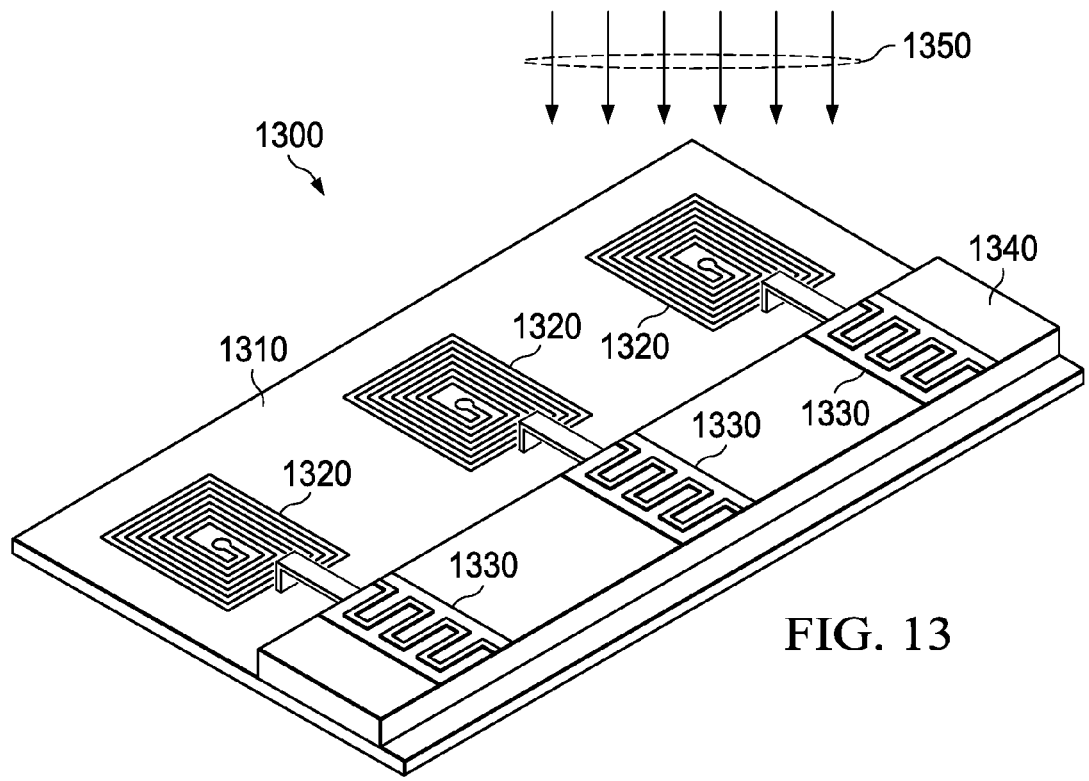
FIG. 13 illustrates a phased array antenna system of the disclosure.

Finally, FIG. 13 illustrates a structure 1300 of a phased array antenna system. A similar antenna system is described in detail in U.S. Pat. No. 6,958,729 to Metz, et al., incorporated herein by reference in its entirety. The structure 1300 includes, e.g., three unit cells on a substrate 1310. Each unit cell includes an inductor 1320 and a capacitor 1330. The inductor 1320 and the capacitor 1330 may operate, e.g., to delay a phase of a signal on a microstrip line 1340. Phase delays on multiple microstrip lines may be configured to produce a desired gain pattern of a phased array antenna, e.g. The substrate 1310 includes a multiferroic medium. An external stimulus 1350, e.g. an electric and/or a magnetic field, may change the permittivity or the permeability of the substrate 1310, thereby changing the capacitance of the capacitor 1330 or the inductance of the inductor 1320. Thus, the phase delay on the microstrip line 1340 may be tuned by the application of the stimulus 1350, providing a means to vary the gain pattern of the antenna.

Figure 5:
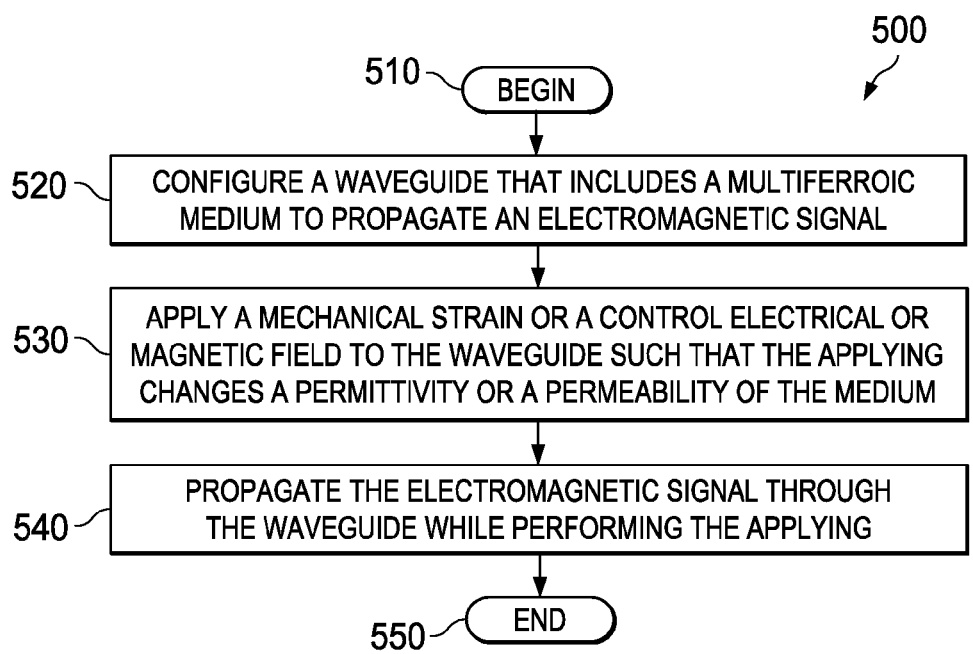
FIGS. 5 and 14 illustrate methods of the disclosure.

Turning to FIG. 5, a method 500 of the disclosure is presented. The method begins with a step 510. In a step 520, a waveguide that includes a multiferroic medium is configured to propagate an electromagnetic signal. In a step 530, a mechanical strain, or a control electrical or magnetic field is applied to the waveguide such that the applying changes a permittivity or a permeability of the medium. In a step 540, the electromagnetic signal is propagated through the waveguide while performing the applying. The method 500 ends with a step 550.

Figure 14:
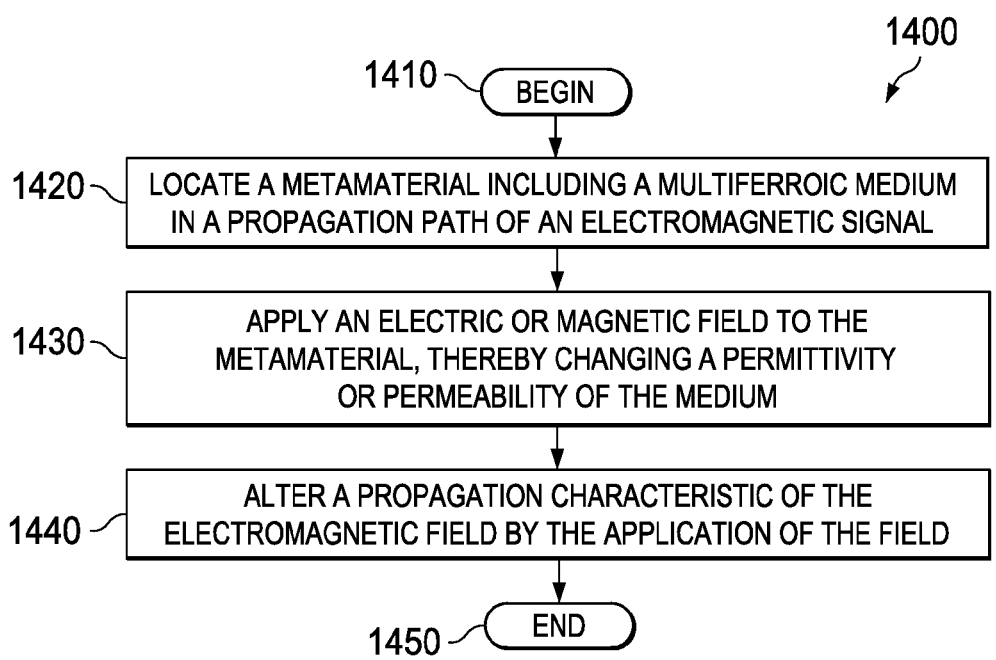

FIG. 14 presents a method 1400 of the disclosure. The method begins with a step 1410. In a step 1420, a metamaterial including a multiferroic medium is located in a propagation path of an electromagnetic signal. In a step 1430, an electric or magnetic field is applied to the metamaterial. The application of the field changes a permittivity or permeability of the medium. In a step 1440, a propagation characteristic of the electromagnetic field is altered by the application of the field. The method 1400 ends with a step 1450.

Although the present invention has been described in detail, those skilled in the art should understand that they can make various changes, substitutions and alterations herein without departing from the spirit and scope of the invention in its broadest form.

What is claimed is:

1. A method of processing an electromagnetic signal, comprising:
    configuring a waveguide that includes a multiferroic medium to propagate said electromagnetic signal, said multiferroic medium including at least one ferroelectric domain and at least one ferromagnetic domain that shares an interface with said ferroelectric domain;
    applying a mechanical strain or a control electrical or magnetic field to said waveguide such that the applying changes a permittivity or a permeability of said medium; and
    propagating said electromagnetic signal through said waveguide while performing said applying.

2. The method as recited in claim 1, wherein said waveguide is configured to propagate optical frequencies.

3. The method as recited in claim 1, wherein said waveguide is configured to propagate terahertz frequencies.

4. The method as recited in claim 1, wherein a transmission characteristic of said waveguide is changed in response to said strain or said control field.

5. The method as recited in claim 1, wherein said waveguide includes a metamaterial.

6. The method as recited in claim 1, wherein said applying changes an index of refraction of said medium.

7. A method of processing an electromagnetic signal; comprising:
    locating a metamaterial including a multiferroic medium in a propagation path of said electromagnetic signal, said multiferroic medium including at least one ferroelectric domain and at least one ferromagnetic domain that shares an interface with said ferroelectric domain;
    applying an electric or magnetic field to said metamaterial, thereby changing a permittivity or permeability of said medium; and
    altering a propagation characteristic of said electromagnetic field by said applying.

8. The method as recited in claim 7, wherein said metamaterial is a heterogeneous multiferroic material.

9. The method as recited in claim 7, wherein a frequency range over which said metamaterial has a negative index is changed by said applying.

10. The method as recited in claim 7, wherein said electromagnetic signal has a frequency in the microwave band.

* * * * *